Figure 1:
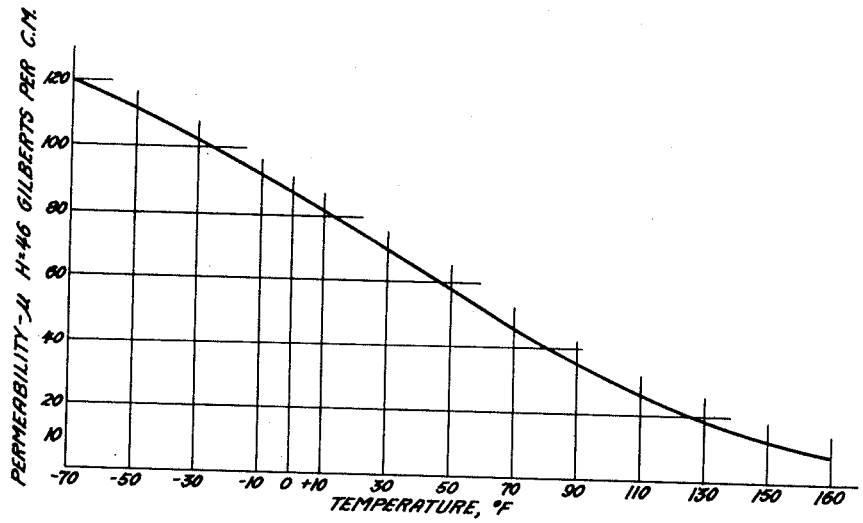

Feb. 9, 1954

R. E. SCHWYN ET AL 2,668,944

TEMPERATURE COMPENSATOR ALLOY

Filed Dec. 28, 1951

INVENTORS
Raymond E. Schwyn &
Ralph H. Mitchel
BY
Willits, Helwig & Baillio
ATTORNEYS Patented Feb. 9, 1954

2,668,944

UNITED STATES PATENT OFFICE 2,668,944

TEMPERATURE COMPENSATOR ALLOY

Raymond E. Schwyn and Ralph H. Mitchel, Flint, Mich., assignors to General Motors Corporation, Detroit, Mich., a corporation of Delaware Application December 28, 1951, Serial No. 263,788

7 Claims. (Cl. 324—70)

This invention relates to an alloy and particularly to a temperature-responsive magnetic alloy for making indicating instruments, such as magnetic speedometers, almost completely independent of variations in temperature over an unusually wide range of temperatures.

Magnetic measuring instruments, such as a typical vehicle speedometer, generally are of a type which comprises a stationary field plate within which is positioned a magnet adapted to be driven, directly or indirectly, from a shaft whose rotational speed is to be measured, and a drag element positioned in the magnetic field between the magnet and the field plate and adapted to be displaced from its position of rest a distance proportional to the speed of rotation of the shaft.

Such an instrument provides quite accurate indications when operated at the temperature at which it is calibrated, but if it is operated at temperatures appreciably above or below this temperature, the speed indications will be considerably in error. This error is caused by the fact that, while the strength of the magnetic field between the poles of the magnet and the field plate remains substantially constant within the range of temperatures to be considered, the electrical resistance of the materials of which the drag element is made increases very considerably with increases in temperature and decreases proportionally with decreases in temperature. As is well known, the strength of the eddy currents induced in the drag element by the moving lines of force between the magnet and the field plate varies inversely with these veriations of resistance and temperature. Consequently, inasmuch as the deflection of the drag element from its position of rest depends on the strength of the eddy currents flowing therein (the strength of the magnetic field remaining constant), the speed indications given thereby will be high at temperatures below, and low at temperatures above, that at which the instrument is calibrated.

It is obvious that indications of an instrument of the type described will be unaffected by temperature changes if neither the electrical resistance of the drag element nor the strength of the magnetic field passing through the drag element varies with changes in temperature. Since, as hereinbefore stated, the strength of the magnetic field passing through the drag element is practically constant throughout the temperature range to be considered, this condition will be fulfilled by forming the drag element of a material or combination of material having the temperature coefficient of electrical resistance approaching zero. Such materials exist, but their electrical resistances are so high as to make their use in an instrument of this type impractical.

Accordingly, it has been a common expedient to make the drag element of a material having a low electrical resistance with the accompanying relatively high temperature coefficient of electrical resistance. The indications of such an instrument will be unaffected by temperature changes if the magnetic field passing through the drag element thereof is caused to vary in such a manner as to compensate for the changes in resistance of the drag element. This, of course, means that the strength of the magnetic field passing through the drag element must vary directly with the resistance of the drag element. Several means of accomplishing this have been proposed.

If a piece of magnetic material having a negative temperature coefficient of magnetic permeability is positioned in the instrument so as to shunt a portion of the magnetic field of the magnet away from the drag element, an increase in temperature will cause less of the flux from the magnet to flow into the shunt and more to flow through the drag element. Similarly, as the temperature decreases, more of the magnetic flux will flow into the shunt and less through the drag element. The use of such a shunt, therefore, will tend to compensate the instrument for temperature changes. Such devices are shown in patents to Wedin 1,848,068 and Davey 1,848,057.

Several magnetic materials having appreciable negative temperature coefficients of permeability are known, among which are certain alloys of nickel and copper and certain alloys of nickel and iron. However, heretofore no alloy has been known which has proved to be entirely satisfactory because of a lack of uniformity in its corrective influence when the instrument of which it forms a part has been subjected to a very wide range of temperatures.

Until recently, operating temperatures for automotive speedometers normally have been considered to range from 0° F. to 100° F., with a total error in the readings of 4 miles per hour at a speed of 60 miles per hour, for example, being permissible. To meet such a moderate standard, the alloys heretofore used have been generally satisfactory. However, many types of modern motor vehicles, particularly those which are used for military purposes, are required to be equipped to operate under extreme temperature conditions, such as those encountered in arctic and tropical climates. Accordingly, these requirements necessitate the use of speedometers which are compensated to register speed with a maximum error of 5% over a temperature range of minus 65° F. to plus 160° F., for example. When an instrument of the type described above is subjected to these temperature conditions, its accuracy becomes totally inadequate, the temperature error in many instances commonly being as great as 30 miles per hour over this wide temperature range.

Moreover, many of the temperature compensator alloys previously used undergo permanent changes in permeability upon exposure to low temperatures, resulting in substantial errors in the instrument readings. It definitely has been shown by photomicrographic and X-ray analyses that these permanent permeability changes are due to a phase change from gamma to alpha in the alloys.

In the past, two alloys also have been combined in magnetic measuring instruments, these alloys, acting together, having a resultant compensation effect which renders the readings fairly accurate at most operating temperatures. However, not only are such "double compensators" more expensive than single alloy compensators, but they likewise heretofore have become inaccurate by undergoing permanent changes in permeability because of the aforementioned phase change at extremely low temperatures.

A principal object of our invention, therefore, is to provide an alloy which may be employed in magnetic measuring instruments, without resorting to an additional alloy, to greatly reduce errors in readings due to temperature changes over an extremely wide range of temperatures, such as from minus 110° F. to plus 170° F. The use of such an alloy permits a simpler construction than that necessary in the double compensator type of instrument, thereby substantially reducing manufacturing and assembly costs.

A further object of this invention is to provide a temperature compensator alloy which may be incorporated into a magnetic measuring instrument wherein the alloy comprises a combination of elements which shift the phase boundary between the gamma and alpha phases out of the operating temperature range of the instrument and in which the compensator is stabilized to temperatures as low as minus 110° F.

Figure 2:
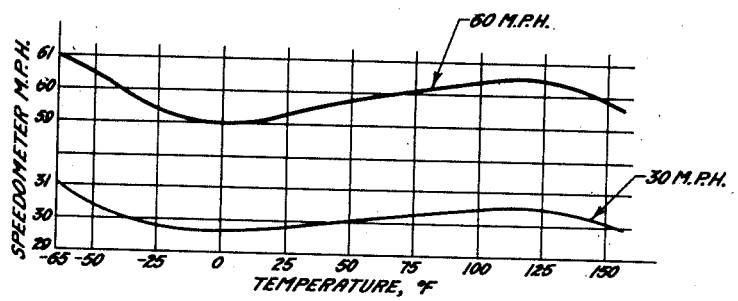

Other objects and advantages of our invention will more fully appear from the following description taken in conjunction with the accompanying drawing in which:

Figure 1 is a graph showing a temperature-permeability curve, over a very wide range of temperatures, of a temperature compensator formed from an alloy in accordance with our invention; and Figure 2 is a graph showing curves in which actual speeds are compared with speedometer readings at various temperatures.

The above objects are attained in accordance with the present invention by the use of a temperature compensator formed from an alloy containing major proportions of iron and nickel and a minor proportion of chromium, optimum properties being obtained when small amounts of manganese and silicon are also included in the alloy. More specifically, we have obtained excellent results with an alloy which comprises 29.25% to 31.5% nickel, 0.3% to 2.9% chromium, manganese not in excess of 1%, silicon not in excess of 0.5% and the balance substantially all iron.

Various incidental impurities, such as sulfur, phosphorus or carbon may also be present in the usual small amounts as incidental impurities without any appreciable detrimental effects. Generally, however, the carbon content should not be permitted to exceed approximately 0.5%, while neither phosphorus nor sulfur should be present in quantities greater than 0.1% for best results. We also have found that, inasmuch as cobalt functions in a manner generally similar to that of the nickel when present in small quantities, if desired, cobalt not in excess of approximately 3% may be included in the alloy as a substitute for an equivalent amount of nickel. For best results, however, the cobalt content should not exceed 0.1%, the approximate quantity in which it is normally present in commercial nickel.

Accordingly, the alloy which we prefer to use and which possesses the best combination of properties as a temperature compensator comprises 30.0% to 31.0% nickel, 0.4% to 1.2% chromium, 0.2% to 0.5% manganese, 0.1 to 0.3% silicon, and the balance substantially all iron. This preferred composition provides a temperature-permeability curve which is an approximately straight line function within the wide temperature range from minus 110° F. to plus 170° F.

In this alloy the nickel content is very important inasmuch as raising the proportion of nickel increases the permeability and slope of the temperature-permeability curve as well as raising the temperature above which the permeability of the alloy remains constant with increases in temperature, this point commonly being known as the Curie point of the alloy. Inasmuch as small variations in the nickel content in this alloy, therefore, result in great differences in the temperature-responsive characteristics, it is important that the percentages be maintained within the specified limits. If the nickel content is raised above approximately 31.5%, the alloy has too high a permeability and too steep a curve for practical purposes. To insure the necessary permeability, on the other hand, the nickel content should not be below 29.25%. Moreover, if the nickel content is less than this amount, the Curie point of the alloy is at too low a temperature, thus precluding the possibility of having the desired straight temperature-permeability curve within the operating temperature range. Below a percentage somewhat less than 29.25% the alloy becomes very inefficient, and with percentages not much below this minimum limit the alloy has magnetic transformation points within the operating range of minus 110° F. to plus 170° F., particularly if the chromium content is lower than the aforementioned minimum amount.

Increasing the nickel content also increases the permeability and gamma phase of the alloy and lowers its phase change temperature, while decreasing the nickel content increases the amount of the alloy in the alpha phase. Therefore, if the amount of nickel is decreased below approximately 29.25%, the phase-change temperature is raised to too great an extent, resulting in poor low temperature stability.

Chromium is included to improve the low temperature stability of the alloy by shifting the aforementioned phase boundary and increasing the amount of the alloy in the gamma phase, quantities as small as 0.3% being sufficient to provide this result to a satisfactory degree. Moreover, as previously indicated, the presence of chromium in the above amounts precludes the possibility of the alloy having magnetic transformation points over the wide range of temperature for which the instrument is designed. However, inasmuch as raising the chromium content also has the effect of lowering both the Curie point and the permeability of the alloy, it should not be present in amounts more than approximately 2.9%.

The presence of manganese also affects the Curie point of the alloy, increasing the manganese content resulting in shifting the Curie point toward the lower temperatures. Therefore, as hereinbefore stated, to obtain best results the alloy should not contain more than approximately 0.5% manganese, although satisfactory results may be had with a manganese content as high as 1%. The addition of manganese also appears to have the effect of decreasing both the permeability and the slope of the temperature permeability curve. However, the most important contribution of manganese for low temperature compensation purposes is its ability to improve low temperature stability by shifting the phase boundary and increasing the amount of the alloy in the gamma phase. Thus, it is usually advantageous to have a manganese content of not less than 0.2%, and at least 0.05% manganese is preferably included in the alloy to improve its working properties.

Silicon does not appreciably affect the permeability of the alloy nor the slope of the temperature-permeability curve if maintained below approximately 0.5%. However, the presence of this element in quantities as low as 0.05%, in combination with the manganese, aids in providing the alloy with low-temperature stability.

The presence of carbon in amounts up to 0.5% has little effect on the Curie temperature and serves to provide low-temperature stability by lowering the phase boundary of the alloy. In amounts greater than this amount, however, the temperature-permeability curve of the alloy becomes unsatisfactory, and the optimum curve is obtained when the carbon content does not exceed approximately 0.15%.

If cobalt is substituted for a portion of the nickel, its presence raises the Curie temperature and increases the permeability of the alloy and also increases the amount of the alloy in the gamma phase. Since these effects are substantially similar to those obtained with nickel, the latter may be replaced by cobalt in amounts as large as 3%. If cobalt is added in excessive amounts, however, the shape of the temperature permeability curve of the alloy becomes unsatisfactory, and the optimum shape of this curve is usually obtained when the cobalt content is not greater than 0.1%.

We have thus provided a temperature compensator alloy which is adapted to be attached to a rotating magnet and positioned within the magnetic field of a measuring instrument. Thus used, this alloy constitutes a shunt which permits the reduced electrical resistance of a speed cup, which tends to cause the readings to be too high at low temperatures, to be compensated by the increased permeability of the compensator alloy. At temperatures above those for which the instrument is calibrated, on the other hand, the reverse is true, the reduced permeability of the compensator permitting more of the flux to pass through the speed cup to counteract the increased resistance of the latter. Hence, the temperature compensator directly controls the proportion of the magnetic flux which passes through the speed cup to thereby provide maximum accuracy of speed indication over an exceptionally wide range of temperatures.

The efficiency of the above described temperature compensator alloy can be seen from the curve shown in Figure 1. In this graph, temperatures ranging from minus 70° F. to plus 160° F. are plotted on the abscissa of the curve, while the ordinate represents the magnetic permeability of the compensator when subjected to a magnetic field of constant strength, the particular curve shown resulting when the field intensity is 46 gilberts per centimeter. From this graph it can be seen that our alloy produces a temperature-permeability curve which is a generally straight line through the wide temperature range from minus 70° F. all the way to plus 160° F. and results in instrument readings which are unusually accurate over this range. Although this alloy is designed to meet certain requirements hereinbefore mentioned, including those stemming from military considerations, its temperature-permeability curve actually is an approximate straight line down to temperature as low as minus 110° F.

As can be seen from Figure 2, wherein speedometer readings in miles per hour are plotted versus temperature, the actual speeds indicated by the curve varies insignificantly from the speedometer readings. This is true both at lower speeds, as indicated by the 30 miles per hour curve, and at higher speeds as shown by the 60 miles per hour curve. It will be noted, in fact, that over the temperature range from minus 65° F. to plus 160° F. the 60 miles per hour curve indicates that there is approximately only a 2 miles per hour maximum variation between the speedometer readings and the actual speed of the vehicle being tested. The 30 miles per hour curve shows that such a speedometer is even more accurate at lower speeds over this wide temperature range, the maximum variation in speedometer readings being approximately only slightly more than one mile per hour in this latter instance. Thus it will be seen that our invention provides a temperature compensator alloy which may be incorporated into a magnetic measuring instrument to reduce errors due to temperature changes to amounts only slightly over 3% when the instrument is subjected to all temperatures which might possibly be encountered.

It is to be understood that, while our invention has been described by means of certain specific examples, the scope of our invention is not to be limited thereby except as defined in the appended claims.

We claim:

1. A temperature-responsive compensator for magnetic measuring instruments, said compensator formed from an alloy containing 29.25% to 31.5% nickel, 0.3% to 2.9% chromium, silicon not in excess of 0.5%, manganese not in excess of 1%, and the balance substantially all iron.

2. A temperature compensator for a magnetic measuring instrument formed from an alloy having a magnetic permeability which decreases with increases in temperature, said alloy comprising 29.25% to 31.5% nickel, 0.3% to 2.9% chromium, 0.05% to 0.5% silicon, 0.05% to 1% manganese, and the balance substantially all iron.

3. A temperature-responsive compensator for magnetic measuring instruments, said compensator being formed from an alloy comprising 30.0% to 31.0% nickel, 0.4% to 1.2% chromium, 0.2% to 0.5% manganese, 0.1% to 0.3% silicon, and the balance substantially all iron.

4. A temperature compensator for use in a magnetic measuring instrument, said compensator being formed from an alloy comprising 29.25% to 31.5% nickel plus cobalt, 0.3% to 2.9% chromium, manganese not in excess of 1%, silicon not in excess of 0.5%, and the balance substantially all iron, the cobalt content not to exceed approximately 3%.

5. A shunt element for use in a magnetic measuring instrument, said shunt element being formed from an alloy consisting essentially of 29.25% to 31.5% nickel, 0.3% to 2.9% chromium, 0.05% to 0.5% silicon, 0.05% to 1.0% manganese, carbon not in excess of 0.5%, and the balance substantially all iron.

6. In a magnetic measuring instrument, a temperature-responsive compensator for correcting errors due to temperature changes, said compensator being formed from an alloy having the following composition:

| | |
|---|---|
| Nickel | 30% to 31%. |
| Chromium | 0.4% to 1.2%. |
| Manganese | 0.2% to 0.5%. |
| Silicon | 0.1% to 0.3%. |
| Carbon | 0.15% maximum. |
| Cobalt | 0.1% maximum. |
| Phosphorus | 0.1% maximum. |
| Sulfur | 0.1% maximum. |

Balance substantially all iron.

7. In a magnetic measuring instrument having a rotatable magnet positioned within a field plate, a temperature responsive compensator adjacent said magnet for shunting a portion of the magnetic field of the magnet, said compensator being formed from an alloy consisting essentially of 29.25% to 31.5% nickel, 0.3% to 2.9% chromium, 0.05% to 0.5% silicon, 0.05% to 1% manganese, and the balance substantially all iron.

RAYMOND E. SCHWYN.
RALPH H. MITCHEL.

References Cited in the file of this patent

FOREIGN PATENTS

| Number | Country | Date |
|---|---|---|
| 54,715 | Switzerland | Feb. 20, 1911 |

OTHER REFERENCES

Alloys of Iron and Nickel, vol. 1, page 425. Edited by Marsh. Published in 1938 by the McGraw-Hill Book Co., New York.